United States Patent [19]

Hedblom et al.

[11] Patent Number: 5,670,227

[45] Date of Patent: Sep. 23, 1997

[54] PATTERNED PAVEMENT MARKINGS WITH UPRIGHT RETROREFLECTORS

[75] Inventors: Thomas P. Hedblom, Eagan; T. Ian Bradshaw, Afton, both of Minn.

[73] Assignee: Minnesota Mining and Manufacturing Company, St. Paul, Minn.

[21] Appl. No.: 634,663

[22] Filed: Apr. 18, 1996

Related U.S. Application Data

[63] Continuation of Ser. No. 247,050, May 20, 1994, abandoned.

[51] Int. Cl.$^6$ ..................................................... C09J 7/02
[52] U.S. Cl. ........................... 428/48; 428/51; 428/168; 428/169; 428/343; 428/354; 428/906
[58] Field of Search ........................ 428/48, 51, 168, 428/169, 343, 354, 906

[56] References Cited

U.S. PATENT DOCUMENTS

| | | | |
|---|---|---|---|
| 3,758,192 | 9/1973 | Bingham | 350/105 |
| 4,035,059 | 7/1977 | DeMaster | 350/105 |
| 4,388,359 | 6/1983 | Ethen et al. | 428/143 |
| 4,490,432 | 12/1984 | Jordan | 428/220 |
| 4,564,556 | 1/1986 | Lange | 428/325 |
| 4,988,541 | 1/1991 | Hedblom | 427/163 |
| 4,988,555 | 1/1991 | Hedblom | 428/172 |
| 5,053,253 | 10/1991 | Haenggi et al. | 427/204 |
| 5,127,184 | 7/1992 | Wong | 428/1 |
| 5,227,221 | 7/1993 | Hedblom | 428/172 |

FOREIGN PATENT DOCUMENTS 6-280221  10/1994  Japan.

OTHER PUBLICATIONS

Transportation Research Record No. 1409, "Correlation of the Nighttime Visibility of Pavement Marking Tapes With Photometric Measurement," National Academy Press, Washington, D.C., 1993.
ASTM D 4061–89, Standard Test Method for Retroreflectance of Horizontal Coatings.
ASTM E 808–91, Standard Practice for Describing Retroreflection.

*Primary Examiner*—Jenna Davis
*Attorney, Agent, or Firm*—Gary L. Griswold; Walter N. Kirn; Robert H. Jordan

[57] ABSTRACT

An improved pavement marking sheet material, and a method for making such pavement marking sheet material. The pavement marking sheet material comprises a selected configuration of upright retroreflectors. The upright retroreflectors are arranged in a selected configuration so as to maximize reflectivity as measured at actual observation geometries by allowing light to be incident to effective portions of the retroreflective elements on the upright retroreflectors.

43 Claims, 2 Drawing Sheets

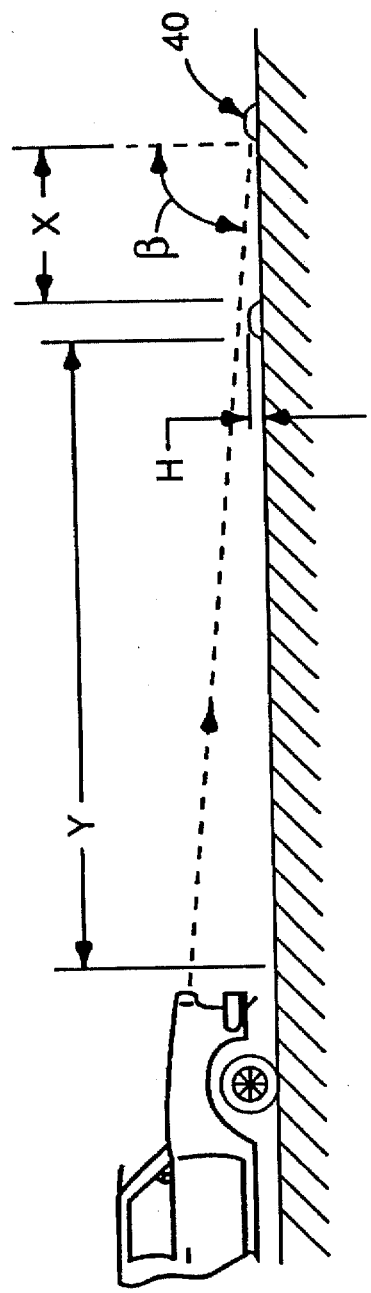
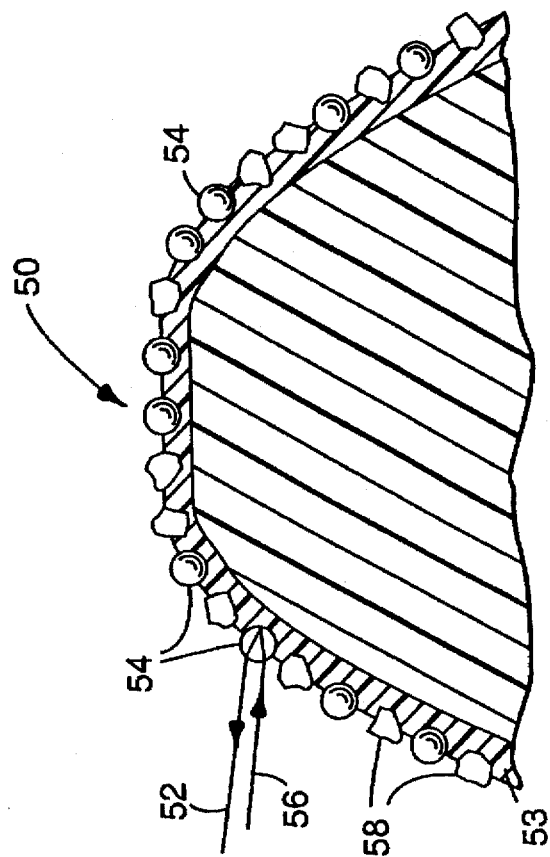
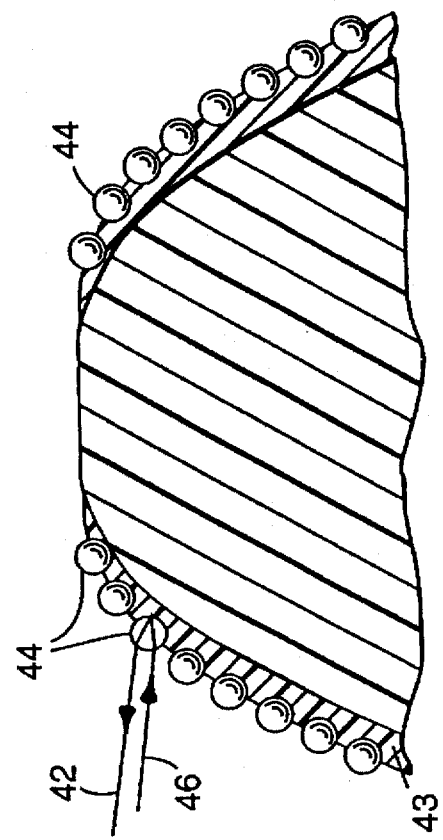
FIG. 3
FIG. 5
FIG. 4

PATTERNED PAVEMENT MARKINGS WITH UPRIGHT RETROREFLECTORS

This is a continuation of application Ser. No. 08/247,050 filed May 20, 1994 now abandoned.

FIELD OF THE INVENTION

The present invention relates to an improved pavement marking material, and a method for making such pavement marking material. In particular the invention relates to a pavement marking material with a selected configuration of upright retroreflectors, such configuration selected for maximum retroreflectivity when measured at geometries corresponding to actual observation conditions as from a typical automobile. The invention also relates to patterned pavement markings with specularly reflective pigments such as pearlescent pigments and aluminum flakes. The invention also relates to patterned pavement markings with ultraviolet-fluorescent pigments.

BACKGROUND

Pavement markings, such as those delineating the centerline and edgeline of a roadway are important in order to provide visual guidance for motor vehicle drivers. An ongoing challenge to the industry is to provide pavement markings of increasing brightness, particularly at nighttime when visibility is limited.

Currently, pavement markings typically rely on an optical system comprising transparent microspheres partially embedded in a binder layer containing diffusely reflective pigment particles such as those of titanium dioxide ($TiO_2$) or lead chromate ($PbCrO_4$) as reflectors. In use, light from the headlamp of a vehicle enters the microsphere and is refracted to fall on a diffusely reflective pigment. Some portion of the light is returned generally along the original entrance path in the direction of the vehicle so as to be visible to the vehicle driver.

Pavement marking tapes with reflective protrusions or protuberances on their upper surfaces, sometimes referred to as patterned or profiled pavement markings, are more desirable than flat pavement markings to improve visibility, especially at night and when the roadway is wet. The raised pattern facilitates runoff of rain water. Also, the raised pattern provides non-horizontal surfaces to support retroreflective microspheres. The non-horizontal surface isolates the optical surfaces of the microspheres from abrasive wear by traffic and provides a more effective orientation of the microspheres and pigments. A raised pattern also permits use of a highly efficient combination of microspheres and specular reflective pigments.

U.S. Pat. No. 4,388,359 (Ethen et al.) discloses a pavement marking sheet having protuberances on its upper surface which carry partially exposed microspheres by which the protuberances are made retroreflective and which are separated by recessed areas in which microspheres are fully embedded and not exposed, so as to improve the daytime appearance of the sheet material.

U.S. Pat. Nos. 4,988,555 (Hedblom) and 4,988,541 (Hedblom) disclose a pavement marking comprising a base sheet and integral protrusions having a top and side surfaces. Selected side surfaces are covered with a bead bond layer, into which retroreflective microspheres are subsequently partially embedded. U.S. Pat. No. 5,227,221 discloses a pavement marking comprising a base sheet and integral protrusions having a top and side surfaces, where all side surfaces and the top surface of each protrusion are covered with a bead bond layer.

All the above-mentioned patents disclose pavement markings embodying a uniform pattern of protrusions; that is, the size, shape and spacing of the protrusions are substantially the same across the face of the marking.

U.S. Pat. No. 3,758,192 (Bingham) discloses the use of specular pigments such as nacreous pigments or aluminum flakes dispersed in a binder. This coating is applied to fabrics, and transparent retroreflective microspheres applied to the coating to make retroreflective clothing.

Retroreflectivity is currently typically measured by an instrument in the laboratory, at fixed entrance and observation angles, according to ASTM 01.26.23. Recent work (Transportation Research Record 1409 published 1994 by the Transportation Research Board) has shown that the entrance angle at which light is incident and observation angles from which a driver actually views a pavement marking, referred to hereinafter as "approximate driver geometries", are greatly different from those geometries at which reflectance values are currently measured in the laboratory, referred to herein as "laboratory geometries". Constructions that yield a lower brightness compared to a standard when measured at laboratory geometries may result in much higher brightness values compared to that standard when measured at approximate driver geometries.

SUMMARY

The present invention provides a pavement marking material with increased retroreflective performance due to selected configuration of upright retroreflectors as described below. The selected configuration results in minimized shadowing so that the most optically efficient retroreflective elements, those on the vertical sides of the upright retroreflectors, are exposed to incident light. Shadowing refers to the vertical aspect of an upright retroreflector blocking, or shadowing, nearby upright retroreflectors such that the retroreflective microspheres on the vertical sides of the shadowed upright retroreflector are not visible and thus are not utilized.

When evaluating retroreflective brightness or retroreflectivities of various constructions at the approximate driver geometries, relative retroreflectance rankings have been found to have dramatically changed from those determined at laboratory geometries. In order to accurately compare retroreflectivities, and therefore practical utility of pavement markings, it is necessary to not only measure all constructions being evaluated at a selected range of geometries, but also to ensure that the chosen geometries are approximate driver geometries.

In brief summary, the invention provides a pavement marking material comprising a continuous polymeric base sheet having a plurality of upright retroreflectors on its upper surface. The upper surface is made up of a plurality of segments arranged in a selected manner, with each segment having a front edge, rear edge, and two side edges. Each segment also has one upright retroreflector or an array of a plurality of upright retroreflectors positioned along its front edge and a spacing zone that is free of upright retroreflectors along its rear edge such that the upright retroreflectors are positioned closer to the front edge than to the rear edge. The longitudinal length of the spacing zone (i.e., in the direction of the front edge/rear edge axis) is greater than the average distance between adjacent upright retroreflectors. The pavement marking material comprises a plurality of segments arranged with the front edge of a segment abutting the rear edge of an adjacent segment. The term segment merely refers to the spatial arrangement of specified portions of the upper surface. The upper surface may be an integral sheet with retroreflectors formed therein or may actually be made up of separate pieces that are tiled or arranged together. Several examples of possible segments are shown in FIG. 2. When applied to a roadway, the marking material is oriented such that the front edge to rear edge axis of each segment is parallel to the major direction of travel.

In some embodiments, the array of the segment comprises a plurality of rows. In such instances, they are preferentially offset from each other so that the front surfaces of upright reflective elements in each row are exposed to incident light. Selected side surfaces are covered with a bead bond layer, into which a plurality of particles are subsequently partially embedded. The particles include retroreflective microspheres and skid-resistant particles. The bead bond layer, or binder layer, may contain reflective pigments. The reflective pigments may be diffusely reflective pigments such as titanium dioxide or lead chromate. Alternatively, the reflective pigments may be specularly reflective pigments such as pearlescent (nacreous) pigments or aluminum flakes. In addition to the reflective pigments, the binder layer may also include ultraviolet-fluorescent (UV-fluorescent) pigments.

The primary use of this invention is as a patterned or profiled pavement marking. The invention has greater retroreflectivity at entrance angles common to roadway delineation than comparable constructions not employing an optimized configuration of upright retroreflectors. The optimized configuration results in the exposure and utilization of the most optically effective retroreflective elements, those on the vertical sides of the upright retroreflective elements. Patterned or profiled pavement markings with the upright retroreflectors arranged closer together will have vertical sides of subsequent upright retroreflectors blocked or shadowed by the upright retroreflector in front of it. Therefore, most of the retroreflective effect that results from such a pavement marking is from the retroreflective elements on or near the top surfaces of the upright retroreflectors, which are less optically efficient than those on the vertical sides of the upright retroreflectors. In short, the major advantage of an upright retroreflector, the ability to utilize the highly efficient specularly reflective pigments and reflectors with the microspheres, is lost or greatly diminished.

Pavement markings of the invention with their optimal configuration of upright retroreflectors are also expected to have better conformance to the road than a comparably constructed pavement marking with more of these upright retroreflectors spaced closer together. The reason the pavement marking will be more conformant is because it has a greater percentage of depressed areas void of upright retroreflectors. These depressed areas are thinner, resulting in better overall conformability.

Pavement markings of the invention may also have improved skid-resistance since there are larger areas of flat base sheet between arrays of upright retroreflectors.

In addition, pavement markings of the invention will be less expensive to manufacture. Since the expensive microspheres are only applied to the upright retroreflectors, the reduced numbers of upright retroreflectors results in less microspheres being needed. Also, the materials which make up the base sheet will also be minimized.

BRIEF DESCRIPTION OF THE DRAWINGS

The invention will be further explained with reference to the drawing, wherein:

FIG. 3 is a schematic diagram demonstrating the calculation of optimum height and spacing of the upright retroreflectors for a given entrance angle.

FIG. 4 is a schematic diagram of an embodiment of a protrusion demonstrating the optics of the incident light falling on the microspheres on the sides of the upright retroreflective elements, demonstrating the criticality of the vertical surfaces being exposed to incident light.

FIG. 5 is a schematic diagram of an embodiment of a protrusion with binder layer and particles over the entire exposed surface.

Figure 1:
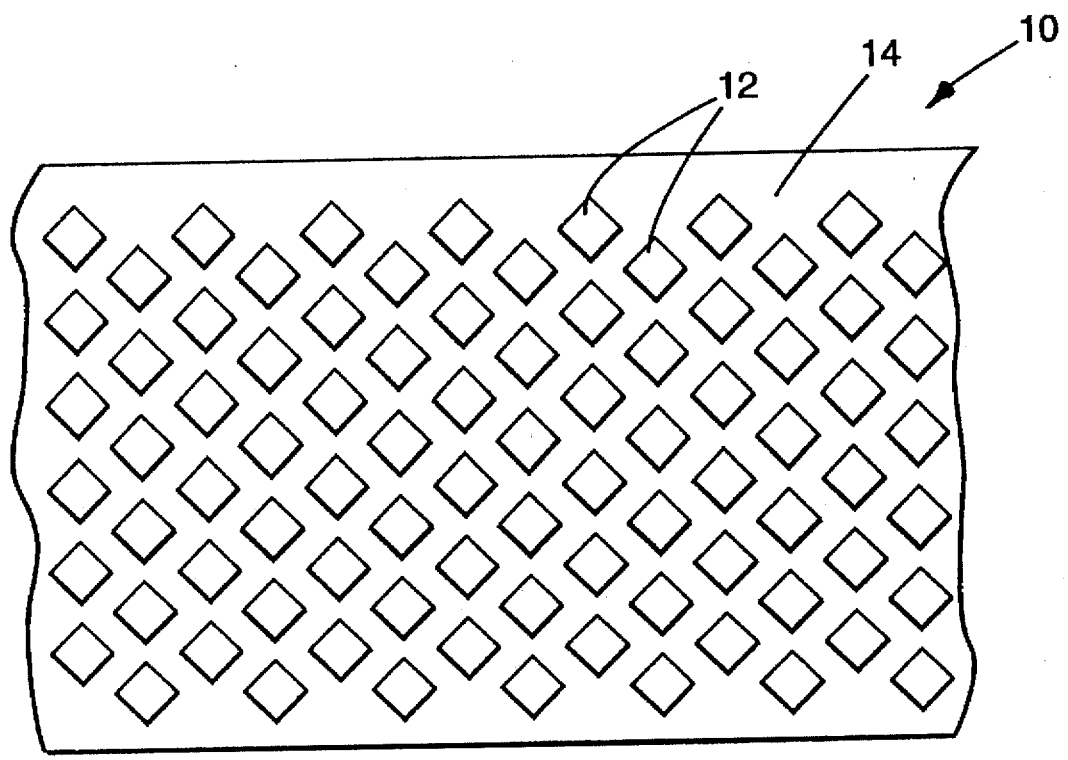
FIG. 1 is a schematic diagram of a pavement marking material with upright retroreflectors.

These figures, which are idealized and not to scale, are intended to be merely illustrative and non-limiting.

DETAILED DESCRIPTION OF ILLUSTRATIVE EMBODIMENTS

As mentioned above, the invention provides a pavement marking with a selected configuration of upright retroreflectors so as to maximize reflectivity by minimizing shadowing. Spacing the upright retroreflectors so that the vertical sides of the upright retroreflectors are exposed ensures that the most optically efficient retroreflective elements, those on the vertical sides of the upright retroreflectors, will be utilized.

An upright retroreflector may be comprised of either a protrusion which is an integral part of the base sheet, or a separately formed protrusion which is applied to a flat base sheet. In the case of protrusions which are an integral part of the base sheet, all (see FIG. 5) or selected surfaces (see FIG. 4) of the protrusion may be covered with a binder layer, into which a plurality of particles are subsequently embedded. The particles include retroreflective microspheres or skid-resistant particles, or a combination thereof. The binder layer may contain reflective pigments and UV-fluorescent pigments. In the case of protrusions applied to a flat base sheet, the protrusions may be formed for example by extruding a rod of material, for example a thermoplastic containing reflective pigment, in a desired shape and adhering retroreflective microspheres to the rod, which is then cut into wafers. An alternative would be to embed ceramic microspheres into a thermoplastic pellet containing a specular reflective pigment. The base shape of these protrusions, that is, the shape of the base of the protrusion in the plane parallel to the surface of the base sheet, may be of any suitable shape, for example a polygon or a circle or an oval. Alternatively, sheets of retroreflective material may be applied to the rod before it is cut into wafers. Illustrative examples of retroreflective materials that may be used in this manner include microsphere-based retroreflective sheeting, e.g., encapsulated-lens, exposed-lens, or embedded-lens retroreflective sheeting, and cube corner type retroreflective sheeting. In view of the relatively small size of the upright retroreflectors in this invention as compared to the typical size of the cells in conventional cellular products, it will typically be preferred to use embedded-lens or exposed-lens microsphere-based products or aluminized cube corner type products rather than cellular microsphere-based or cube corner products. Particles may optionally be applied to the top surface of the wafers if desired. In either embodiment of protrusion, whether the protrusion is an integral part of the base sheet or is a separately formed protrusion which is then applied to a base sheet, the protrusions may be coated with binder layer and microspheres or sheets of retroreflective material in such a manner as to be one color when viewed from one direction and another when viewed from the other direction. For instance, one kind of retroreflective material may be placed on one side of the upright retroreflector and a second material placed on the other side of the upright retroreflector, so that the color and/or retroreflective effect depends on the direction of approach.

It is generally accepted that for night driving, the driver is looking on the order of 50 meters ahead of the vehicle most of the time, i.e., just beyond the reach of the low-beam or dipped headlights on the road. At this distance and beyond only the raised surfaces of a typical profiled pavement marking are visible to the driver, as the flat base of the marking is obscured by the raised elements. At closer distances, such as 5 to 15 meters, the driver usually observes the lane markings as peripheral images and makes use of them for lateral positioning within the lane. At these closer distances, the portion of the flat base between the protrusions tend to be the dominant visual aspect of the marking.

Nighttime visibility performance of pavement markings is predicted by a surrogate method of laboratory or field photometric measurement. There are currently several photometric systems in use that vary widely in geometric and precision capability.

With the advent of pavement markings with a variety of retroreflective optical systems and surface characteristics, measurements in the laboratory and field have been found to lack correlation with the markings' actual visibility performance as experienced by motor vehicle drivers. (Transportation Research Record 1409 published 1994 by the Transportation Research Board)

For example, as measured by conventionally used photometric systems, a conventional pavement marking with a large number of uniformly arranged upright retroreflectors will exhibit a higher retroreflectivity than a similar pavement marking with every second and third row of upright retroreflectors removed. When measured at approximate driver geometries however, the pavement marking with every second and third row of upright retroreflectors removed, that is, with ⅔ of its upright retroreflectors removed, may have a higher reflectivity. This is because when the upright retroreflectors are closer together, the sides of the successive upright retroreflectors are covered or shadowed by the preceding upright retroreflector, so that only the retroreflective elements on or near the tops of the upright retroreflectors are struck by incident light. The most optically efficient microspheres, those on the vertical sides of the upright retroreflectors, are not utilized to the extent that the vertical surfaces are covered. The reason the retroreflective surfaces on the vertical sides of the upright retroreflectors are more efficient is because incident light from the headlamp of a motor vehicle will fall closer to normal on these vertical retroreflective surfaces than it will on retroreflective surfaces on the flat portion of the pavement marking. The closer to normal the light falls on the retroreflective surface, the more efficient the retroreflective surface becomes because of its increased ability to allow more light to enter the retroreflective element.

The entrance angle may be defined as the angle between the illumination axis and the retroreflector axis; that is, the angle between the light source and an angle perpendicular to the surface being viewed, in this case the surface of a pavement marking, e.g., the portion from which a number of microspheres partially protrude. The observation angle may be defined as the angle between the illumination axis and the observation axis.

The instruments available to measure reflectivity in the laboratory or in the field are generally capable of measuring entrance angles of about 86.0° to 86.5°, and observation angles of about 1.0° to 1.5°. ASTM 01.26.23 standard calls for a geometry of 86.0°/0.2°, i.e., 86.0° entrance angle and 0.2° observation angle. These are unrealistic geometries for pavement markings, as these geometries would in effect place the viewer some distance behind the vehicle from which the object is being viewed. Following are some calculated geometries for an American mid-size automobile at selected distances between a light source and a pavement marking; 30 meters is approximately 88.5°/1.0°, 50 meters is approximately 89.3°/0.6°, and 80 meters is approximately 89.6°/0.4°. As can be seen from the selected distance examples, the entrance angles encountered by automobile drivers are much higher than the 86.0° specified in the ASTM standard.

A general formula which may be used to calculate a desired distance between protrusions of uniform height in order to completely expose (i.e., free of occlusion at actual presentation orientations) the vertical surfaces of subsequent protrusions and thereby maximize retroreflectivity as measured at approximate driver geometries is given by $$\text{distance} = \text{height of protrusion}/\tan(90° - \text{entrance angle})$$

The distance calculated from this formula will be that distance which will result in no shadowing; that is, the entire vertical surface of each protrusion will be fully exposed to incident light at that entrance angle. It should be kept in mind that optimal spacing of protrusions in terms of other aspects such as water drainage, wear resistance, or skid resistance, may be different from the spacing of protrusions calculated for optimal retroreflective performance. If the distance between protrusions is sufficiently large relative to the width of the base of the protrusions, the width of the protrusions will have minimal impact on shadowing. As the protrusions are spaced closer together however the impact of the protrusion width increases.

The material of the pavement marking should be of sufficient strength to resist permanent deformation or excessive wear under the weight of traffic. The base sheet is typically a resilient polymeric base sheet. If the base sheet comprises integral protrusions, the protrusions have a top surface and at least one side surface. The tops of the protrusions essentially define a plane substantially parallel to the surface of the sheet. Preferably, less than 45 percent of the area of the base sheet is covered by protrusions. More preferably, less than 15 percent of the area of the base sheet is covered by protrusions.

A suitable base sheet may preferably be formed using known methods and materials, such as described in U.S. Pat. No. 4,490,432 (Jordan). The base sheet described in the patent comprises elastomer precursors, not yet vulcanized or cured, which therefore permit viscoelastic deformation. Exemplary materials are acrylonitrile-butadiene polymers, millable urethane polymers and neoprenes. Extender resins may be included. Particulate fine-diameter fillers, such as silica, may be included. Pigments, such as titanium dioxide, are preferred in the base sheet to provide a white diffuse surface to uncoated portions of the base and protrusions. Another useful pigment is lead chromate which imparts a yellow color.

The binder layer may contain reflective pigments. The pigment may be a diffusely reflective pigment such as titanium dioxide or lead chromate, or may be a specularly reflective pigment such as pearlescent pigment or aluminum flakes. Alternatively, the microspheres may instead be coated with a specular reflector, e.g., dielectric, aluminum, or silver, on their embedded portions, hereinafter referred to as coated microspheres. The binder layer may also contain UV-fluorescent pigments. The binder layer is formed by mixing the pigments into a light-transmissive medium, and then coating or applying this medium onto the integral protrusions of the base sheet. The important properties for this binder include light-transmissivity, durability for intended use, ability to keep the pigment particles suspended, and adequate wetting and bead adhesion. It is important that the coating medium be light-transmissive so that light entering the retroreflective article is not absorbed by the medium but is instead reflected back. For ease of coating, the medium will preferably be a liquid with a viscosity of less than 10,000 centipoise at room temperature. Vinyls, acrylics, epoxies, and urethanes are examples of suitable mediums. Urethanes such as disclosed in U.S. Pat. No. 4,899,555 (Hedblom) are a preferred medium. Any suitable mixing technique that avoids high shear that would deleteriously change the particles' shape may be used to disperse the pigment in the medium. The dispersion is then coated onto the integral protrusions of the base sheet. After coating, specular pigment flakes in the designated size range and in the designated concentration tend to orient themselves with their flat surfaces in approximately tangential relationship with the microsphere. Preferably, these pigments will bend through their broadest dimension to conform to the contour of the microsphere in a cup-like fashion, thereby providing good retroreflective efficiency.

Specular pigment flakes which may be used in the invention are generally thin, plate-like particles, which are large in comparison to the diffusely reflective pigments commonly used in pavement markings. The key property of these pigments is that their length and width is much greater than their thickness. Other specular flakes possessing this property may also be used. Due to this property of being much greater in length than in thickness, these flakes tend to align themselves parallel to the web or surface on which they have been coated. When the microsphere is dropped on and indents the coating, the flakes tend to line up around the embedded portion of the microsphere like a coating. This property is known as "leafing". This tendency of the flakes to effectively coat the microsphere results in higher levels of reflectivity, as the reflectivity will have a larger specular component than if this coating did not take place. Particularly preferred specular pigments because of their very large increase in reflectivity are pearlescent pigments and aluminum flakes.

Specular pigments have a large specular reflectance component, so that light hitting the pigment particle tends to be reflected at a mirror image from normal of the angle at which it entered. These specularly reflective flakes have an average maximum dimension falling in the range of about 4 to about 36 micrometers and an average thickness in the range of about 2 to about 5 micrometers, the binder preferably containing at least about 20 percent by weight based on dry weight of pigment compared to total weight of medium and pigment. More preferably, the weight percent of pigment will be higher, in the range of 35 to 40 percent. If the concentration of pigment is too high or too low, the leafing ability of the pigment may be interfered with, and the brightness decreased. An example of a suitable pearlescent pigment is a typical mica-based pearlescent pigment also containing titanium dioxide available from the Mearl Corporation of New York, N.Y. An example of a suitable aluminum flake is ATA 2100, with average particle size of 32 µm, available from Alcan-Toyo America, Naperville, Ill.

Ultra-violet (UV) fluorescent pigments may also be added to the binder layer. UV-fluorescent pigments are pigments that fluoresce light in the visible spectrum when excited by the ultraviolet light from a special UV-headlamp of a motor vehicle. The UV light from the motor vehicle's headlamp falls onto a microsphere, and is diffracted below to fall on the pigment in the binder layer. The pigment is excited by the incident UV light, and gives off energy as light in the visible spectrum, some of which is visible to the driver of the motor vehicle. The important property of these pigments are that they are excitable by UV light, and subsequently emit light in the visible range. These UV-fluorescent pigments will often have a specific daytime color. An example of a suitable UV-fluorescent pigments is Blaze Orange GT-15-N, available from Dayglo Corporation (Nalco Chemical Company) of Cleveland, Ohio. The fluorescent pigments are located throughout the binder layer.

The transparent microspheres of some embodiments of the invention range from about 25 to about 600 micrometers (µm) in diameter, although larger microspheres will also work. Preferably, the microspheres range in diameter from 200 to 250 µm. The microspheres of the invention can be of any material suitable to adequately refract light, such as ceramic or glass. Preferably, the microspheres are ceramic for durability. U.S. Pat. No. 4,564,556 (Lange) teaches the making of ceramic microspheres. The microspheres preferably have an index of refraction greater than 1.5. More preferably the index of refraction is greater than 1.7. For those embodiments incorporating a diffusely reflective pigment such as titanium dioxide, the index of refraction is preferably about 1.85 to about 1.90. For those embodiments with specularly reflecting pigments, the index of refraction is preferably about 1.93.

FIG. 4 is a schematic diagram of an embodiment of an upright retroreflective element of the invention. The light 42 enters the microsphere 44 which is partially embedded in a binder layer 43 comprising specularly reflecting pigments. The incident light 42 is refracted below to focus at the specularly reflective coating on the microsphere. The light 46 is reflected at a mirror image from normal of the angle at which it entered. For a specularly reflecting element on a horizontal surface, such as a flat pavement marking, the specularly reflecting surface returns light at such angles that little or none of the incident light is returned to the motor vehicle driver. It is for this reason that an upright element is critical in order to make efficient use of the specular optics. It follows then not to lose this advantage of a vertical component by covering or shadowing the vertical sides.

Retroreflective articles of the invention may be prepared in the following manner. The binder dispersion is prepared by mixing reflective pigment flakes and optionally UV-fluorescent pigments in a light-transmissive medium, for example with an air mixer, taking care not to expose the flakes to high shear so as to maintain their integrity. This dispersion is then coated onto the integral protrusions of a pre-embossed base sheet. The spacing of the protrusions is determined as earlier specified. Coating is by any suitable means; squeeze roll coating as disclosed in U.S. Pat. No. 4,988,541 (Hedblom) and U.S. Pat. No. 5,227,221 (Hedblom) is a preferred method. Alternatively, a film of liquid bead bond supported by a release liner or sheet may be laminated to the selected surfaces of the protrusions.

The microspheres are delivered onto the binder layer while it is still fluid so that the microspheres will sink into the coating and become partially embedded to a depth of approximately 50 to 60 percent of their average diameter. This depth of embedment is important for both adequate anchoring and efficient optics. The microspheres are delivered from a hopper usually equipped with a metering blade to control the number of microspheres put on. If the binder is coated from solvent, some of the solvent may be evaporated prior to placement of the microspheres in order to improve control of the depth of embedment. Alternatively, excess solvent may be evaporated after microsphere deposition. The depth of embedment, or sink, of the microsphere is controlled through a combination of the relationship between the surface energy of the microspheres and the surface tension of the coating, and the viscosity of the fluid coating. If the surface energy of the microsphere is close to the surface tension of the fluid coating, the microsphere will tend to float and not sink entirely into the coating. The surface energy of the microsphere can be altered by various surface treatments, such as the use of surfactants. The viscosity of the coating may be controlled, for example through heating, solvent content, addition of thickeners, selection of composition, or addition of fillers. Thixotropic agents or other thickening agents may be added to the binder in amounts that will not substantially decrease brightness.

By controlling the surface energy of the microspheres and the rheology of the coating, the manner in which the binder material draws up around the microspheres is controlled. Capillation is the term used to describe the wicking action of the binder material around the microsphere. This capillation is important because the binder material forms a socket-like structure around the microsphere and holds it in place. With the capillation taken into account, the microspheres are embedded on average to a depth of approximately 50 to 60 percent of their average diameter. As the binder material hardens as by cooling, loss of solvent or other volatiles, or by chemical reaction such as cross-linking or polymerizing, the microspheres are held in place.

Alternatively, retroreflective articles of the invention may be prepared by applying retroreflective protrusions to a flat base sheet. A rod of suitable material, for example a thermoplastic containing reflective pigment, is extruded in a desired shape. Retroreflective microspheres may be applied to the rod which is then sliced into wafers. Alternatively, sheets of retroreflective material may be applied to the rod before it is cut into wafers. Particles such as skid-resistant particles or retroreflective microspheres may be applied to the top surface of the wafers before or after application to the base sheet if desired.

In a particularly preferred embodiment, the base sheet has integral protrusions similar to those described in U.S. Pat. No. 4,988,555 (Hedblom). In commercial versions of the product disclosed herein, the protrusions described are squares about 1 millimeter (mm) in height and about 0.63 centimeters (cm) on each side with transparent microspheres partially embedded in and protruding from a binder layer containing reflective pigments. In this particular patent, the squares are in a regularly repeating pattern, and the spacing between the sides of the squares is about 0.32 cm. The squares are 45° from normal in the observation axis. Alternating rows are offset or staggered. (see FIG. 1) A particularly preferred embodiment of the invention differs from the embodiment disclosed in that patent in that every second and third row of protrusions are replaced by flat base sheet, and in that the protrusions are about 2 to about 3 millimeters (mm) in height. (see FIG. 2) Another preferred embodiment of the invention differs from the embodiment disclosed in that patent in that every third through sixth row of protrusions is removed.

Figure 2:
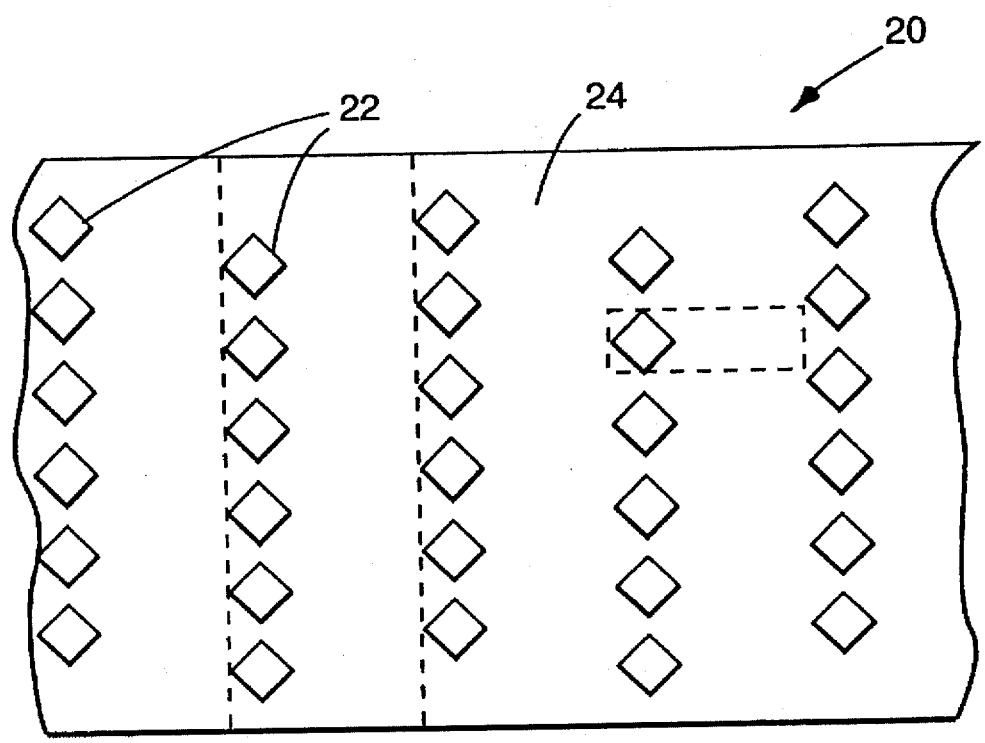
FIG. 2 is a schematic diagram of a pavement marking material similar to FIG. 1 with a selected configuration of upright retroreflectors to maximize reflectivity by minimizing shadowing.

In another particularly preferred embodiment, the protrusions are the same dimensions with the same spacing as FIG. 2, only turned 45° so that the sides of the squares are perpendicular to the observation axis.

EXAMPLES

The invention will be further explained by the following illustrative examples which are intended to be non-limiting.

Unless otherwise indicated, all amounts are expressed in parts by weight.

The Coefficient of Retroreflected Luminance ($R_L$ in mcd/m$^2$/1x) was measured at typical industry standard geometries, and at geometries more closely matching those actually encountered by a motor vehicle driver. Measurements were made according to ASTM D 4061-89. Results are given in the following table. Intrinsic geometry as described in ASTM E 808-91 was used. Entrance/observation angles are stated. Presentation angle was kept constant at 0 degrees, orientation angle was maintained at −180 degrees. The entrance/observation angles given are for the left headlight, to centerline marking, to observer at each of the distances specified.

Example 1

Is a sample of STAMARK™ Brand Pavement Marking Tape Series 380 obtained from the Traffic Control Materials Division of 3M. This material contains 225 micrometer ceramic microspheres with an index of 1.75.

Example 2

A piece of Example 1 was modified by leaving two transverse rows of raised protuberances as is, then removing two rows with a razor blade. The sequence was repeated until a sample large enough for photometric work was obtained.

Example 3

An example similar to number 2 except that for every two rows that remained untouched, four rows were physically removed.

Example 4

An example similar to number 2 except that for every two rows that remained untouched, six rows were physically removed.

Example 5

A second sample of STAMARK™ Brand Pavement Marking Tape Series 380 was obtained from the Traffic Control Materials Division of 3M.

Example 6

A piece of Example 5 was modified by leaving one transverse row of raised protuberances as is, then removing two transverse rows with a razor blade. The sequence was repeated until a sample large enough for photometric work was obtained.

Example 7

A sample of patterned rubber that is used in the product disclosed in Example 1 was squeeze roll coated with a polyurethane resin formulation incorporating 40 percent by weight Fine Pearl pigment (code number 139V, particle size range 4–32 microns, specific gravity 3.2) made by the Mearl Corporation of 41 East 42nd Street, New York, N.Y. 10017. Immediately after coating, 1.94 index of refraction ceramic beads were embedded into the urethane on the sides of the raised protuberances. The urethane was cured and any excess beads removed. Bead embedment was determined to be near 50 percent.

Example 8

A piece of Example 7 was modified in the same manner as that of Example 2.

Example 9

A prototype patterned pavement marking was produced by coating a film of urethane resin incorporating 33 weight percent titanium dioxide. Ceramic microspheres used in Example 5 were embedded into the resin in a closed packed arrangement, and the urethane then cured. The film was then slit into strips 0.32 cm in height and 10 cm in length. The strips were adhered to wooden sticks of the same dimensions, and spaced five inches apart which closely corresponds to the geometric spacing arrangement of Example 3 and Example 6.

Example 10

A prototype similar to Example 9 was produced using the pigmented urethane and ceramic microspheres as described in Example 7.

Example 11

A prototype similar to Example 10 was produced except that the pearlescent pigment was replaced by an equal weight percent of Aluminum Pigment Flake ATA 2100 (average particle size 32 microns, specific gravity 2.5) made by Alcan-Toyo America, 1717 North Boulevard, Suite 201, Naperville, Ill. 60540.

Example 12

A prototype similar to Example 10 was produced except that prior to placing the ceramic beads into the coating, they were coated with a silver reflecting mirror about their entire surface. After solidification of the coating, the exposed surfaces of the ceramic beads were then etched with acid, which removes the silver coating from the exposed surfaces of the microspheres. The result was 100 percent oriented, hemispherical silver coated microspheres.

Example 13

A sample of STAMARK™ Brand Pavement Marking Tape Series 380 was cut on the bias so as to give a row of square, raised reflective elements. The squares were parallel to the length of the strip. The strips were then adhesively attached in parallel transverse rows to a 4 inch wide strip of aluminum sheeting. The spacing between the rows was selected to be the same as that of Example 6. Very high reflectivity resulted because the vertical reflecting surfaces were perpendicular to the direction of viewing.

Coefficient of Retroreflected Luminance $R_L$ in mcd/m²/lx (Left Headlight, Entrance/Observation Angle, Presentation = 0, Orientation = −180)

| Example No. | Conventional Geometries 86.0/0.2 | Distance from Left Headlight, to Centerline | | |
|---|---|---|---|---|
| | | 86.5/1.0 30 Meters | 88.5/1.0 50 Meters | 89.3/0.6 80 Meters 89.6/0.4 |
| 1 | 3200 | 1900 | 1550 | 1900 * |
| 2 | 2250 | 1400 | 1500 | 1700 * |
| 3 | 1800 | 800 | 1500 | 2500 * |
| 4 | 1100 | 500 | 850 | 1600 * |
| 5 | 2800 | 1700 | 1100 | 1200 1250 |
| 6 | 1700 | 1050 | 1300 | 1500 1700 |
| 7 | 28800 | 2820 | 1780 | 1870 2060 |
| 8 | * | * | * | 4800 13000 |
| 9 | 2370 | 1670 | 2470 | 2370 2330 |
| 10 | 36000 | 2990 | 5080 | 9870 14700 |
| 11 | 45000 | 4160 | 7190 | 14400 22800 |

-continued

Coefficient of Retroreflected Luminance $R_L$ in mcd/m²/lx (Left Headlight, Entrance/Observation Angle, Presentation = 0, Orientation = −180)

| Example No. | Conventional Geometries 86.0/0.2 | Distance from Left Headlight, to Centerline | | |
|---|---|---|---|---|
| | | 86.5/1.0 30 Meters | 88.5/1.0 50 Meters | 89.3/0.6 80 Meters 89.6/0.4 |
| 12 | 74800 | 9330 | 15900 | 34100 49400 |
| 13 | * | * | * | * * |

* These samples were not measured at this set of photometric angles.

Various modifications and alterations of this invention will become apparent to those skilled in the art without departing from the scope and spirit of this invention.

What is claimed is:

1. A pavement marking sheet material comprising a continuous polymeric base sheet having a plurality of upright retroreflectors on its upper surface, said upright retroreflectors comprising retroreflective elements, said upper surface being made up of a plurality of segments arranged in a selected manner, each said segment having a front edge, a rear edge, and two side edges, and having an array of a plurality of said upright retroreflectors positioned along said front edge and a spacing zone that is free of said upright retroreflectors along said rear edge, the longitudinal length L of said spacing zone being determined by the formula L>H/tan(90°−θ), where H is the height of the upright retroreflectors and θ is a design entrance angle that falls within the range of 86.9° to 89.9°;

said marking material comprising a plurality of segments arranged with the front edge of a segment abutting the rear edge of an adjacent segment.

2. The sheet material of claim 1 wherein said segments comprise arrays that comprise a plurality of rows of upright retroreflectors, said rows being parallel to said front edge of said segments.

3. The sheet material of claim 1 wherein said arrays of upright retroreflectors are centered about at least two distinct longitudinal axes extending through said material.

4. The sheet material of claim 1 comprising a plurality of segments arranged with one side edge of a first segment abutting one side edge of a second segment.

5. The sheet material of claim 1 wherein at least some of the upright retroreflectors are protuberances formed in said upper surface of said base sheet, said protuberances having retroreflective elements thereon.

6. The sheet material of claim 1 wherein at least one retroreflector includes a side surface which forms an angle of at least about 60° to the plane of said base sheet.

7. The sheet material of claim 1 wherein said retroreflective elements comprise transparent microspheres partially embedded in and protruding from a binder layer.

8. The sheet material of claim 1 wherein said pavement marking sheet has greater reflectivity than a comparably constructed pavement marking sheet with a greater number of upright retroreflectors.

9. The sheet material of claim 1 wherein said pavement marking sheet has greater skid-resistance than a comparably constructed pavement marking sheet with a greater number of upright retroreflectors.

10. The sheet material of claim 1 wherein said pavement marking sheet has increased conformability to a substrate than a comparably constructed pavement marking sheet with a greater number of upright retroreflectors.

11. The sheet material of claim 1 wherein said retroreflectors comprise cube corner retroreflective elements.

12. The sheet material of claim 1 wound upon itself into a roll form.

13. The sheet material of claim 1 wherein said upright retroreflectors have a base shape selected from the group consisting of polygon, circle, or oval.

14. The sheet material of claim 13 wherein said upright retroreflectors have a base shape that is rectangular, said upright retroreflectors being oriented on base sheet such that one of the diagonals through opposing corners of each element is substantially parallel with the longitudinal axis of the sheet material.

15. The sheet material of claim 13 wherein said upright retroreflectors have a base shape that is rectangular, said upright retroreflectors being oriented on base sheet such that one of the sides of each element is substantially parallel with the longitudinal axis of the sheet material.

16. The sheet material of claim 5 wherein said protuberances each have at least one dimension in the plane of the base sheet that is less than about 15 millimeters, have a height of at least about 1 millimeter, and have a side surface that is adapted to face oncoming traffic when said sheet material is applied to a roadway and which forms an angle to the plane of the base sheet of at least about 30°, said side surface carrying retroreflective elements protruding from the surface.

17. The sheet material of claim 5 in which said protuberances occupy no more than about fifteen percent of the area of said base sheet.

18. The sheet material of claim 5 wherein the areas between said protuberances form a connected grid of valleys.

19. The sheet material of claim 5 in which the areas between protuberances form a connected grid of valleys running diagonally with respect to the direction of expected road travel.

20. The sheet material of claim 16 wherein all dimensions of said protuberances in the plane of said base sheet are less than about 15 millimeters.

21. The sheet material of claim 16 in which the protuberances have at least one dimension in the plane of said base sheet that is less than about 10 millimeters.

22. The sheet material of claim 16 wherein all dimensions of said protuberances in the plane of said base sheet are less than about 10 millimeters.

23. The sheet material of claim 7 wherein said microspheres have an index of refraction of between about 1.75 and about 2.0.

24. The sheet material of claim 7 wherein said microspheres have an average diameter from about 50 micrometers to about 600 micrometers.

25. The sheet material of claim 7 wherein said microspheres are embedded to a depth of approximately 40 to 65 percent of their average diameter.

26. The sheet material of claim 7 wherein said binder layer comprises ultraviolet-fluorescent pigments.

27. The sheet material of claim 7 wherein said binder layer comprises flakes of a reflective pigment.

28. The sheet material of claim 27 wherein said binder layer comprises flakes selected from the group consisting of aluminum particles and nacreous pigments.

29. The sheet material of claim 27 wherein said binder layer comprises a diffusely reflective pigment.

30. The sheet material of claim 28 wherein said flakes comprise 10 to 50 percent by weight of the total weight of the pigment flakes and binder medium combined.

31. The sheet material of claim 28 wherein said flakes comprise 30 to 45 percent by weight of the total weight of the pigment flakes and binder medium combined.

32. The sheet material of claim 28 wherein said flakes range in average length from about 4 micrometers to about 36 micrometers.

33. The sheet material of claim 28 wherein said flakes tend to orient themselves with their flat surfaces in approximately tangential relationship with the microsphere near the bottom of the microsphere, bending through their broadest dimension to conform to the contour of the microsphere in a cup-like fashion.

34. The sheet material of claim 28 wherein said flakes, while bending through their broadest dimension to conform to the contour of the microsphere in a cup-like fashion, are a greater distance from the microsphere near the midpoint of the microsphere where the contact with the binder ends than at the bottom of the microsphere.

35. A pavement marking sheet material comprising a substrate having a base surface and a structured surface opposite said base surface, said structured surface including:
   a first retroreflection zone including at least one retroreflector;
   a spacing zone adjacent said first retroreflection zone, said spacing zone having a length, L, extending along a longitudinal axis of said material determined by the formula $L > H/\tan(90° - \theta)$, where H is the height of the upright retroreflectors and $\theta$ is a design entrance angle that falls within the range of 86.9° to 89.9°; and
   a second retroreflection zone adjacent said spacing zone, said second retroreflection zone comprising at least one retroreflector.

36. The pavement marking material of claim 35, wherein: said spacing zone is completely free of retroreflective elements.

37. A pavement marking sheet material comprising a substrate having a base surface and a structured surface opposite said base surface, said structured surface including a plurality of retroreflection zones separated by spacing zones, wherein:
   each retroreflection zone includes a plurality of retroreflectors arranged to form an array of adjacent retroreflectors; and
   each spacing zone has a length L extending along a longitudinal axis of said material determined by the formula $L > H/\tan(90° - \theta)$, where H is the height of the upright retroreflectors and $\theta$ is a design entrance angle that fails within the range of 86.9° to 89.9°, said spacing zone being substantially free of retroreflective elements.

38. The sheet material of claim 1, wherein:
   the design entrance angle $\theta$ falls within the range of 88.5° to 89.9°.

39. The sheet material of claim 1, wherein:
   the design entrance angle $\theta$ falls within the range of 89.3° to 89.9°.

40. The sheet material of claim 35, wherein:
   the design entrance angle $\theta$ falls within the range of 88.5° to 89.9°.

41. The sheet material of claim 35, wherein:
   the design entrance angle $\theta$ falls within the range of 89.3° to 89.9°.

42. The sheet material of claim 37, wherein:
   the design entrance angle $\theta$ falls within the range of 88.5° to 89.9°.

43. The sheet material of claim 37, wherein:
   the design entrance angle $\theta$ falls within the range of 89.3° to 89.9°.

\* \* \* \* \*

UNITED STATES PATENT AND TRADEMARK OFFICE
CERTIFICATE OF CORRECTION

PATENT NO.: 5,670,227

DATED: September 23, 1997

INVENTOR(S): Thomas P. Hedblom and T. Ian Bradshaw

It is certified that error appears in the above-identified patent and that said Letters Patent is hereby corrected as shown below:

Col. 14/Line 18   Delete ".retroreflector" and insert in place thereof - -retroreflector ; --.

Col. 14/Line 43   Delete "fails" and insert in place thereof -- falls --.

Col. 14/Line 47   Delete "0" and insert in place thereof -- θ --.

Signed and Sealed this

Twenty-sixth Day of May, 1998

*Attest:*

BRUCE LEHMAN

*Attesting Officer*    Commissioner of Patents and Trademarks